Patented Oct. 2, 1934

1,975,409

UNITED STATES PATENT OFFICE 1,975,409

SOLID STABLE DIAZOAZO SALTS AND PROCESS OF PREPARING THEM

Karl Schnitzspahn, Offenbach-on-the-Main, and Rudolf Jung, Frankfort-on-the-Main-Oberrad, Germany, assignors to General Aniline Works, Inc., New York, N. Y., a corporation of Delaware No Drawing. Application May 15, 1933, Serial No. 671,278. In Germany May 19, 1932

3 Claims. (Cl. 260—69)

The present invention relates to solid stable diazoazo salts and to a process of preparing them; more particularly it relates to a process comprising adding to the aqueous solution of a diazotized aminoazocompound of the group consisting of ortho-aminoazotoluene and meta-aminoazotoluene sulfuric acid sufficient to form the acid diazonium sulfate and separating the solid diazoazo salt, thus obtained.

German Patent No. 89,437 describes a process of preparing stable zinc chloride double salts of diazo- and tetrazo-compounds, respectively, of aminoazo bodies. Example 1 of this patent describes the manufacture of the zinc chloride double salt of diazotized aminoazobenzene. When preparing according to this prescription the zinc chloride double salt by starting from ortho-aminoazotoluene, the salt, thus obtained, possesses an insufficient stability.

We have found that the diazonium sulfate of ortho-aminoazotoluene, which may easily be precipitated from the aqueous solution, possesses a stability far superior to that of the diazonium zinc chloride double salt and allows to obtain diazo preparations of ortho-aminoazotoluene which are very stable and fit for storing.

Even after a storage of 30 days at a temperature of 40° C., the stability of the diazo salt which has been adjusted to a strength of 20% of undiazotized base (molecular weight 225) by means of partly dehydrated aluminium sulfate and anhydrous sodium sulfate, amounts to 90%, whereas the zinc chloride double salt is completely decomposed in the same circumstances. The stability of the corresponding cadmium chloride double salt (cf. U. S. Patent No. 1,840,333) is somewhat better than that of the zinc chloride double salt but does not by far amount to that of the salt described.

The diazo salts from ortho-aminoazotoluene, obtainable according to the process described in the German Patent No. 94,280 by precipitating the solutions with naphthalene disulfonic acids, are too difficultly soluble and, therefore, unfit for the preparation of dyestuffs on the fiber.

Furthermore, we have found that the diazo compound from meta-aminoazotoluene may also be precipitated as acid diazonium sulfate and in this form possesses an essentially better stability than the corresponding zinc chloride double salt prepared according to the process of German Patent No. 89,437. The stability of this diazo salt which has been adjusted to a strength of 20% of undiazotized base (molecular weight 225) by means of partly dehydrated aluminium sulfate and anhydrous sodium sulfate, amounts after a storage of 30 days at a temperature of 40° C. even to 80%, whereas the zinc chloride double salt under these conditions is completely decomposed. The stability of the corresponding cadmium chloride double salt (cf. U. S. Patent No. 1,840,333) is somewhat better than that of the zinc chloride double salt but does not by far amount to that of the salt described.

The following examples serve to illustrate the invention, but they are not intended to limit it thereto; the parts being by weight:

(1) 225 parts of ortho-aminoazotoluene are introduced into 4500 parts of water, while stirring well, and 345 parts of hydrochloric acid of 32.1% strength are added; the whole is stirred thoroughly and cooled to 10° C. Thereupon, there are gradually run in at about 10° C. 360 parts of a sodium nitrite solution of 20% strength so that no nitrite is lost. When the diazotization is finished, the solution is filtered and 250 parts of sulfuric acid of 78% strength are gradually run in drop by drop. The acid diazonium sulfate of diazotized ortho-aminoazotoluene precipitates in part after stirring for a short time. The precipitation is completed by strewing in 500 parts of anhydrous sodium sulfate. The solution is cooled to +5° C. and stirred for about 1 hour. The crystalline precipitate is filtered with suction and freed as far as possible from the adherent mother liquor by pressing; thereupon, it is diluted by about its own weight of anhydrous sodium sulfate, for instance, by 320 parts and dried at 40° C. to 50° C. by repeatedly turning it. There is thus obtained the acid diazonium sulfate of the following probable formula

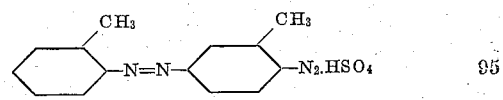

in the form of a dry reddish-brown powder.

It may be put on the market in this form or may be mixed with a suitable acid binding agent such as, for instance, anhydrous sodium carbonate or dry borax. There may also be added to the diazo salt other dyeing assistants such as, for instance, partly dehydrated aluminium sulfate. Thus, for instance, 125 parts of dry borax of the formula $Na_2B_4O_7.2H_2O$ and 200 parts of partly dehydrated aluminium sulfate may be added to the diazo salt, above described.

(2) 275.8 parts of the hydrochloride of meta-aminoazotoluene of 94.8% strength are introduced, while stirring well, into 4100 parts of water, and 94.2 parts of sulfuric acid of 78% strength are added. By external cooling, the temperature of the mixture is brought to 3° C. to 5° C. Thereupon, 750 parts of a sodium nitrite solution cooled down to 0° C. to 5° C. and corresponding to 75 parts of pure sodium nitrite, are introduced under the surface and the whole is stirred until the diazotization is finished and the liquor still shows a nitrite reaction. Thereupon, 408 parts of sulfuric acid of 78% strength are run into the liquor which, if necessary, has been clarified and filtered; the diazonium sulfate is thus precipitated in the form of small crystals. The precipitation is completed by introducing through a sieve 366 parts of anhydrous sodium sulfate. Thereupon, the whole is stirred for 1 hour at a temperature of the liquor of 4° C. to 5° C.

The diazonium sulfate obtained of the following probable formula

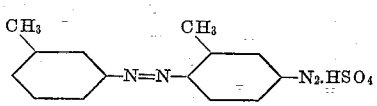

is filtered by suction, squeezed, well mixed with 196 parts of anhydrous sodium sulfate and dried at temperatures not higher than 40° C.

The salt may be put on the market in the present form or may be mixed with partly dehydrated borax and other dyeing assistants such as, for instance, aluminium sulfate, for the purpose of removing adherent sulfuric acid.

Thus, for instance, 100 parts of dry borax of the formula $Na_2B_4O_7.2H_2O$ and 208 parts of partly dehydrated aluminium sulfate may be added to the diazo salt, above described.

The diazo salt obtained represents a brownish-red powder of very good stability.

We claim:

1. The process which comprises adding to the aqueous solution of a diazotized aminoazocompound of the group consisting of ortho-aminoazotoluene and meta-aminazotoluene, sulfuric acid sufficient to form the acid diazonium sulfate and separating the solid diazoazo salt, thus obtained.

2. The process which comprises adding to the aqueous solution of the diazo compound of meta-aminoazotoluene, sulfuric acid sufficient to form the acid diazonium sulfate and separating the solid diazoazo salt, thus obtained.

3. The solid acid diazonium sulfate corresponding to the following formula:

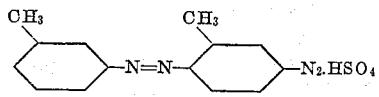

being a brownish-red powder of a very good stability.

KARL SCHNITZSPAHN.
RUDOLF JUNG.